Jan. 31, 1950 H. E. KALLMANN 2,496,095

COMBINED TUBE SOCKET AND BY-PASS CONDENSER

Filed July 10, 1947

INVENTOR.
Henry E. Kallmann
BY
Michael S. Striker
Attorney

UNITED STATES PATENT OFFICE 2,496,095

COMBINED TUBE SOCKET AND BY-PASS CONDENSER

Heinz E. Kallmann, New York, N. Y.

Application July 10, 1947, Serial No. 760,004

9 Claims. (Cl. 175—41)

My present invention relates to amplifier tube sockets, and more particularly to bypass condensers used in combination with such sockets.

Still more particularly, my present invention relates to amplifier tube sockets and bypass condensers therefor which are used in combination with amplifier tubes for amplification of high radio frequencies.

It is well known that in radio frequency amplification all tube electrodes except the input and the output electrodes are either directly connected to ground or held at radio-frequency ground potential by connecting them to ground by bypass condensers. The capacity of these condensers should be so large, and the inductance of their leads should be so small that the bypass presents an effective radio-frequency short-circuit.

A conventional pentode amplifier stage requires at least two bypass condensers to ground, one from the cathode bypassing the cathode bias resistor, and another from the screen grid. In cascades of such amplifier stages, it is usually necessary to prevent feedback coupling between stages via that heater lead that is not grounded by also bypassing the ungrounded heater terminal of each amplifier tube.

Much labor is expended in wiring radio-frequency amplifiers in connecting to each tube socket three separate bypass condensers. Yet the result is rarely satisfactory since these condensers usually are in each other's way, or obstruct other circuit components, and their leads can thus not be made as short as desired. Combinations of several bypass condensers in a single unit have been proposed; but while this solution usually offers a single short ground connection, usually only one of the leads connecting it to the lugs of the tube socket is reasonably short and all others are excessively long.

It is therefore one of the objects of my present invention to provide a combined amplifier tube socket and bypass condenser unit which reduces the length of all bypass leads as far as possible and avoids obstruction to wiring and other circuit elements.

Furthermore, it is the object of my present invention to provide a combined unit of the above type which can easily be mounted and is simple to wire.

Finally, it is also an object of my present invention to provide a socket-condenser unit which provides effective capacitive shielding between the amplifier input and output connections.

With the above objects in view, an amplifier tube socket-condenser unit in accordance with my present invention comprises in combination a socket body consisting of electrically insulating material, a plurality of circularly arranged electrically conductive socket lugs partly embedded in and partly projecting from the rear face of this socket body, a multiple bypass condenser mounted on the rear face of the above socket body within the space surrounded by the circularly arranged socket lugs, and a plurality of electrically conductive leads connecting at least some of the socket lugs with this multiple bypass condenser.

I wish to stress that the term "circularly arranged" as used above and in the following description and claims, is intended to indicate that the socket lugs and contact holes are arranged substantially in a circle around the axis of the socket body.

In accordance with a preferred embodiment of my present invention, the multiple bypass condenser mounted on the rear face of the tube socket or within the same, as will be explained farther below in detail, consists of a short tubular body of dielectric material such as a ceramic composition of a high dielectric constant.

The inner surface of this ceramic tube is preferably entirely covered with an electrically conductive layer forming the grounded electrode. This conducting layer may be formed on the inner surface of the ceramic tube by reducing metallic silver from a suitable mixture by firing at a high temperature.

The outer surface of the tubular condenser body is preferably subdivided into two, three, or more areas upon each of which a metallic layer is formed in the same manner as the grounded electrode is formed on the inside of the tube. These metal-coated areas serve as condenser electrodes and are insulated from each other by leaving uncoated between them narrow strips of the outer surface of the tube.

In accordance with my present invention, I provide on the outer surface of the condenser body at least as many metal coated areas as there are bypass condensers needed for the particular tube circuit and to each such area is connected one end of a short lead. These leads may be tinned ribbons of soft copper and may be soldered to the grounded electrode and the condenser electrodes with silver-saturated solder.

The complete condenser may be covered with a protective coating of insulating material, for example by dipping it into a solution of a plastic insulating substance.

My new multiple bypass condenser is then combined, as explained above, with an amplifier tube socket either by mounting it on the rear face thereof within the space formed by the projecting portions of the socket lugs or by inserting it within a central hole provided within the socket body itself. Thereafter, the free ends of the short leads are connected with the corresponding socket lugs; thus the free end of the lead connected to the metallic layer forming the grounded electrode on the inner surface of the tubular condenser body is connected, e. g. soldered, to a grounded socket lug, and the free ends of the other leads are connected, e. g. soldered, to other socket lugs to be bypassed. Also for soldering the leads to the socket lugs, it is advisable to use a solder having a higher melting point than that of the solder used for other wiring.

The novel features which I consider characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3, 4, 5, 6, 7, 8:
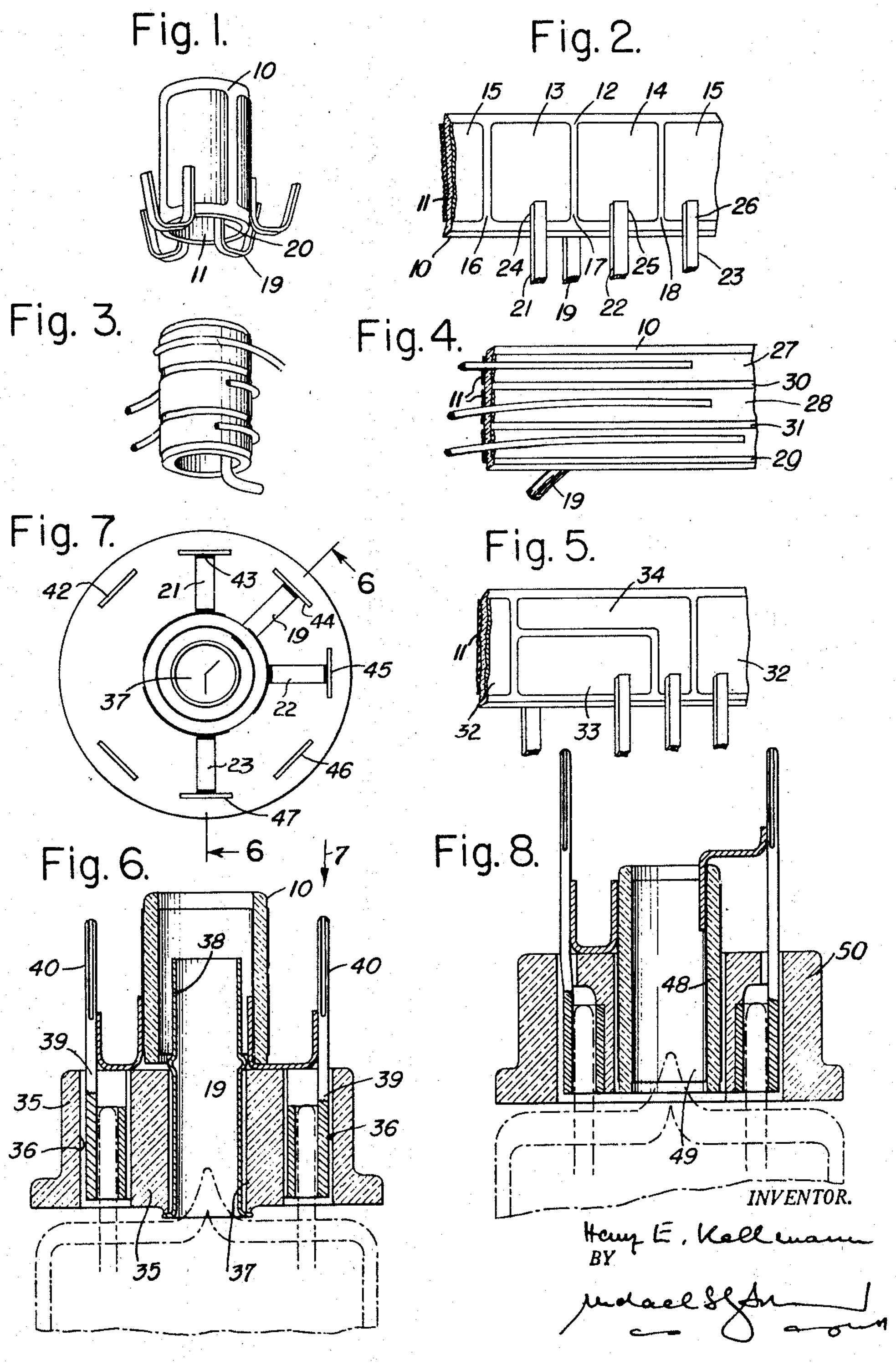
Fig. 1 is a perspective view of a preferred embodiment of a bypass condenser unit in accordance with my present invention adapted to be used in combination with an amplifier socket tube.
Fig. 2 is an opened view of the bypass condenser shown in Fig. 1.
Fig. 3 is a perspective view of another embodiment of a bypass condenser according to my invention, usable in combination with an amplifier tube socket.
Fig. 4 is an opened view of the condenser shown in Fig. 3.
Fig. 5 is an opened view of a modified condenser being similar to the condensers shown in Figs. 1 to 4.
Fig. 6 is an elevational section through a combined socket-condenser unit in accordance with my present invention, embodying a condenser of the type shown in Fig. 1, along line 6—6 of Fig. 7.
Fig. 7 is a rear view of the combined socket-condenser unit shown in Fig. 6, seen in direction of arrow 7 of Fig. 6.
Fig. 8 is an elevational section through a modified embodiment of the combined socket-condenser unit shown in Figs. 6 and 7.

The multiple bypass condenser shown in Figs. 1 and 2 of the drawings consists of a short tubular body 10 of a dielectric material, such as a ceramic composition, and is provided on its inner surface with a silver coating 11 entirely covering this surface and serving as grounded electrode. On the outer surface 12 of the tubular body 10, I provide three rectangular silver layer portions 13, 14, and 15, separated from each other by longitudinal uncoated gaps 16, 17, and 18.

The lead 19 is soldered at 20 to the inner silver coating 11, and the leads 21, 22, and 23 are soldered at 24, 25, and 26 to the silver coated areas 13, 14, and 15, respectively.

In Figs. 3 and 4, I have shown another possible arrangement of the outer electrodes which, in this case, form parallel rings 27, 28, and 29, separated from each other by uncoated gaps 30 and 31, respectively. In this arrangement, usually more surface space is lost by the separating gaps and the wiring may be somewhat obstructed by some of the leads from the condenser electrodes to the socket lugs. However, this disadvantage may be unimportant in view of the fact that this arrangement allows more flexibility in the choice of the lugs to be bypassed and requires somewhat less mechanical strength in the bond between the silver and the ceramic body since the leads may be formed as loops around the condenser and thus be protected from being torn off.

The electrode arrangement shown in Fig. 5 combines some of the advantages of the two condenser types described above. In this arrangement, the electrode layer 32 has the shape of a vertically arranged rectangle, the electrode layer 33 the shape of a horizontally arranged rectangle and the electrode layer 34 is L-shaped, as shown. A condenser of this type is particularly suitable for such unusual cases as bypassing three adjacent lugs out of a total of seven or more.

In Figs. 6 and 7 a combined socket-condenser unit is shown. In this unit, a socket of conventional type is combined with a condenser of the type shown in Fig. 1. The socket consists of a cylindrical socket body 35, made of insulating material and provided with a plurality of parallelly arranged contact holes 36 arranged in a circle around the axis of the socket body.

As usual, a relatively wide hole 37 is provided in the center of the socket body 35 and a tubular metal shield 38 is arranged in this hole.

Furthermore, in each of the contact holes 36, a contact member 39 of conventional design is inserted. Each of these contact members 39 has a rearwardly projecting lug portion 40.

The tubular condenser body 10 is inserted into the space surrounded by the projecting lug portions 40. It is evident that this tubular condenser body 10 has to have an outer diameter small enough to permit the condenser body to fit within the space formed by the projecting lug portions 40 and an inner diameter large enough to permit the tubular metal shield 38 to project into the tubular condenser body, as shown.

The leads of the condenser might be connected to the projecting lug portions in any desired manner. However, in order to describe a preferred embodiment, it should be assumed that in Fig. 7 the contact member 42 corresponds to the grid terminal, the contact member 43 to the cathode terminal, the contact member 44 to the grounded heater terminal, the contact member 45 to the ungrounded heater terminal, the contact member 46 to the plate terminal, and the contact member 47 to the screen grid terminal of the tube.

In this case, I connect the lead 19, connected at its one end to the grounded electrode coating 11 of the condenser, at its other end to the contact member 44 corresponding to the grounded heater terminal, and the free ends of the leads 21, 22, and 23 to the contact members 43, 45, and 47 corresponding to the cathode terminal, the ungrounded heater terminal and the screen grid terminal, respectively.

The contact members 42 and 46 are not bypassed but are well shielded from each other. This shielding is provided by the condenser itself the height of which is comparable to that of the height of the tube socket lugs 40 and thus offers adequate shielding without adding to the overall height and without obstructing any other circuit components.

I have found that with ceramic tubes of ¼″ outer diameter and 5/16″ length I can easily provide three bypass condensers of 1500 microfarads each and can thus satisfactorily bypass frequencies in the range from 10 to 400 megacycles.

The combined socket-condenser unit shown in Fig. 8 is very similar to the one shown in Figs. 6 and 7. In this case, the separate tubular metal shield 38 is omitted and the condenser body 48 is mounted within the relatively wide hole 49 in the socket body 50. In this way, the grounded tubular metal shield at the center of the socket can be omitted. Furthermore, an arrangement of this type has a substantially larger bypass capacity than the arrangement shown in Figs. 6 and 7.

It will be understood that each of the elements described above, or two or more together, may also find a useful application in other types of socket-condenser units, differing from the types described above.

While I have illustrated and described the invention as embodied in combined socket-condenser units and bypass condensers therefor, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. An amplifier tube socket comprising in combination a socket body having a front face and a rear face and consisting of electrically insulating material; a plurality of circularly arranged contact holes in said front face of said socket body; a plurality of circularly arranged electrically conductive socket lugs extending from said contact holes within said socket body to the rear face of said socket body and projecting beyond said rear face of said socket body; an insulating bypass condenser body having opposite faces and mounted on said socket body within the space surrounded by the projecting portions of said circularly arranged socket lugs; a common metal electrode coating provided on one of said opposite faces of said insulating bypass condenser body; a plurality of metallic coatings serving as condenser electrodes provided on the other face of said bypass condenser body spaced from each other; one electrically conductive lead connecting said common metal electrode coating with a grounded socket lug; and a plurality of electrically conductive substantially radially arranged leads connecting at least some of the other socket lugs with said metallic coatings serving as condenser electrodes.

2. An amplifier tube socket comprising in combination a substantially cylindrical socket body having a front face and a rear face and consisting of electrically insulating material; a plurality of circularly arranged parallel contact holes provided in said substantially cylindrical socket body extending from said front face to said rear face thereof at a slight distance from the cylindrical surface of said socket body; a plurality of longitudinal contact members each arranged in one of said circularly arranged parallel contact holes projecting beyond the rear face of said socket body; an insulating bypass condenser body having opposite faces and mounted on said rear face of said socket body within the space surrounded by the projecting portions of said longitudinal contact members; a common metal electrode coating provided on one of said opposite faces of said insulating bypass condenser body; a plurality of metallic coatings serving as condenser electrodes provided on the other face of said bypass condenser body spaced from each other; one electrically conductive lead connecting said common metal electrode coating with the projecting portion of a grounded longitudinal contact member; and a plurality of substantially radially arranged electrically conductive leads connecting the projecting portions of at least some of the other longitudinal contact members with said metallic coatings serving as condenser electrodes.

3. An amplifier tube socket comprising in combination a socket body consisting of electrically insulating material; a plurality of circularly arranged electrically conductive socket lugs partly embedded in and partly projecting from the rear face of said socket body; a tubular bypass condenser body mounted on said rear face of said socket body within the space defined by said circularly arranged socket lugs parallel to the same; a common electrode mounted on the inner surface of said tubular bypass condenser body; a plurality of condenser electrodes mounted spaced from each other on the outer surface of said tubular bypass condenser body; an electrical connection between said common electrode and a grounded socket lug; and a plurality of substantially radially arranged electrical connections each connecting one of said condenser electrodes with one of the other socket lugs.

4. An amplifier tube socket comprising in combination a substantially cylindrical socket body having a rear face and consisting of electrically insulating material; a plurality of electrically conductive socket lugs arranged at least partly within said substantially cylindrical socket body spaced from each other and at a slight distance from the cylindrical surface of said socket body; a relatively wide centrally arranged hole through said cylindrical socket body reaching from the front face to the rear face thereof; a tubular insulating condenser body mounted within said relatively wide centrally arranged hole in said cylindrical socket body; a common electrode coating provided on the inner surface of said tubular insulating condenser body; a plurality of condenser electrode coatings provided spaced from each other on the outer surface of said tubular insulating condenser body; an electrical connection between said common electrode coating and a grounded socket lug; and a plurality of electrical connections each connecting one of said condenser electrode coatings with one of the other socket lugs.

5. An amplifier tube socket comprising in combination a substantially cylindrical socket body having a rear face and consisting of electrically insulating material; a plurality of electrically conductive socket lugs arranged at least partly within said substantially cylindrical socket body spaced from each other and at a slight distance from the cylindrical surface of said socket body; a relatively wide centrally arranged hole through said cylindrical socket body reaching from the front face to the rear face thereof; a tubular insulating condenser body mounted within said relatively wide centrally arranged hole in said cylindrical socket body projecting beyond said rear face of said cylindrical socket body; a common electrode coating provided on the inner surface of said tubular insulating condenser body; a plurality of condenser electrode coatings provided spaced from each other on the outer surface of said tubular insulating body; an electrically conductive lead connecting said common electrode coating with a grounded socket lug; and a plurality of electrically conductive leads each connecting one of said condenser electrode coatings with one of the other socket lugs.

6. For use in combination with an amplifier tube socket provided with a plurality of socket lugs arranged along a circle on the rear face of said tube socket, a bypass condenser unit comprising in combination a tubular insulating condenser body having a diameter being smaller than the diameter of said circle along which said socket lugs are arranged; a common electrode coating covering the inner surface of said tubular insulating condenser body firmly adhering thereto; a plurality of condenser electrode coatings provided on the outer surface of said tubular insulating condenser body firmly adhering to the same and spaced from each other; an electrically conductive lead firmly secured at one end to said common electrode coating and adapted to be secured at its other end to a grounded socket lug; and a plurality of substantially straight and radially arranged electrically conductive leads each connected at one end to one of said condenser electrode coatings and adapted to be connected at its other end to one of the other socket lugs.

7. For use in combination with an amplifier tube socket provided with a plurality of socket lugs arranged along a circle on the rear face of said tube socket, a bypass condenser unit comprising in combination a tubular ceramic condenser body having a diameter being smaller than the diameter of said circle along which said socket lugs are arranged so as to be adapted to be mounted on said rear face of said tube socket; a metallic layer serving as common electrode and entirely covering the inner surface of the tubular ceramic condenser body firmly adhering thereto; a plurality of metallic layers serving as condenser electrodes and provided on the outer surface of said tubular ceramic condenser body firmly adhering to the same; an electrically conductive lead firmly secured at one end to said metallic layer adhering to the inner surface of said tubular ceramic condenser body and adapted to be secured at its other end to a grounded socket lug; and a plurality of substantially radially arranged electrically conductive leads each connected at one end to one of said metallic layers adhering to said outer surface of said tubular ceramic condenser body and adapted to be connected at its other end to one of the other socket lugs.

8. An amplifier tube socket comprising in combination a socket body consisting of electrically insulating material; a plurality of circularly arranged electrically conductive socket lugs partly embedded in and partly projecting from the rear face of said socket body; a bypass condenser body having two faces and mounted on said rear face of said socket body within the space defined by said circularly arranged socket lugs; a common electrode mounted on one face of said bypass condenser body; a plurality of condenser electrodes mounted spaced from each other on the other face of said bypass condenser body; an electrical connection between said common electrode and a grounded socket lug; and a plurality of substantially radially arranged electrical connections each connecting one of said condenser electrodes with one of the other socket lugs.

9. An amplifier tube socket comprising in combination a substantially cylindrical socket body having a rear face and consisting of electrically insulating material; a plurality of electrically conductive socket lugs arranged at least partly within said substantially cylindrical socket body spaced from each other and at a slight distance from the cylindrical surface of said socket body; a relatively wide centrally arranged hole through said cylindrical socket body reaching from the front face to the rear face thereof; an insulating condenser body having two faces and mounted within said relatively wide centrally arranged hole in said cylindrical socket body; a common electrode coating provided on one face of said insulating condenser body; a plurality of condenser electrode coatings provided spaced from each other on the other face of said insulating condenser body; an electrical connection between said common electrode coating and a grounded socket lug; and a plurality of electrical connections each connecting one of said condenser electrode coatings with one of the other socket lugs.

HEINZ E. KALLMANN.

REFERENCES CITED

The following references are of record in the file of this patent:

UNITED STATES PATENTS

| Number | Name | Date |
|---|---|---|
| 2,223,172 | George | Nov. 26, 1940 |
| 2,369,177 | Raskhodof | Feb. 13, 1945 |
| 2,407,359 | White | Sept. 10, 1946 |
| 2,464,377 | Cohen | Mar. 15, 1949 |